United States Patent [19]

Sztipanovits et al.

[11] Patent Number: 5,237,518

[45] Date of Patent: Aug. 17, 1993

[54] OPTIMIZATION METHOD FOR ADAPTIVE SENSOR READING SCHEDULING AND DELAYED ALARM EVALUATION IN REAL-TIME DIAGNOSTIC SYSTEMS

[75] Inventors: Janos Sztipanovits; Csaba Biegl; Gabor Karsai; Samir Padalkar, all of Nashville, Tenn.; Nobuji Miyasaka, Toyonaka; Koji Okuda, Nishinomiya, both of Japan

[73] Assignees: Vanderbilt University, Nashville, Tenn.; Osaka Gas Co., Ltd., Osaka, Japan

[21] Appl. No.: 602,945

[22] Filed: Oct. 27, 1990

[51] Int. Cl.$^5$ .............................................. G08B 23/00
[52] U.S. Cl. ................................ 364/551.01; 371/15.1; 340/505; 395/911
[58] Field of Search ...................... 340/825.07, 825.08, 340/825.10, 825.11, 825.12, 825.13, 825.16, 825.54, 505, 518, 517; 364/550, 551.01, 474.19, 579, 580, 185; 395/911-918; 371/15.1, 29.1

[56] References Cited

U.S. PATENT DOCUMENTS

| | | | |
|---|---|---|---|
| 4,688,183 | 8/1987 | Carll et al. | 364/580 X |
| 4,749,985 | 6/1988 | Corsberg | 340/517 |
| 4,754,409 | 6/1988 | Ashford et al. | 395/16 X |
| 4,812,819 | 3/1989 | Corsberg | 340/517 |
| 4,841,456 | 6/1989 | Hogan, Jr. et al. | 364/550 |
| 4,970,725 | 11/1990 | McEnroe et al. | 364/557.01 X |
| 4,974,181 | 11/1990 | Sinderson et al. | 364/550 |
| 4,985,857 | 1/1991 | Bajpai et al. | 364/551.01 |
| 5,043,987 | 8/1991 | Stark et al. | 364/580 X |
| 5,099,436 | 3/1992 | McCoun et al. | 364/550 |
| 5,130,936 | 7/1992 | Sheppard et al. | 364/551.01 |

OTHER PUBLICATIONS

"Expert System Manages Alarm System Messages," Electrical World, Jul. 1989, pp. 47–48.
Padalkar et al, Proc. of the Fourth Conf. of Artificial Intelligence for Space Applns., pp. 115–124, Dec. 1988.
Sztipanovits et al. International Journal of Intelligent Systems, vol. 3, pp. 269–280, Dec. 1988.
Sztipanovits et al, Proceedings of the Third IEEE Conf. on Artificial Intelligence Applications, pp. 126–133, Dec. 1987.
Sztipanovits et al, Proceedings of the NASA/JPL Symposium on Telerobotics, pp. 131–139, 1987.
Biegl et al, Innovation et Technologie en Biologie et Medicine, vol. 10, No.2 , pp. 205–216, Feb. 1989.
Sztipanovits et al, Coupling Symbolic & Numerical Computing in Expert Systems, II, pp. 117–128, Dec. 1988.
Sztipanovits, Measurement, vol. 7, No. 3, pp. 98–108, Jul.-Sep. 1989.
Sztipanovits et al, Biomed meas Infor Contr, vol. 1, No. 3 pp. 140–146, Dec. 1986.
Sztipanovits et al, IEEE/Seventh Annual Conf. of the Engineering in Medicine & Biology Society, pp. 1132–1136, Dec. 1985.
Sztipanovits, Proceedings of the IEEE International Symposium on Circuits & Systems, pp. 2359–2362, Dec. 1988.
Blokland et al., Proceedings of the American Control conf. pp. 620–626, Dec. 1988.
Karsai et al, Proceedings of the American Control Conf., Dec. 1988, pp. 1–6.
Karsai et al, Proceedings of the IEEE Symposium of Intelligent Control, pp. 4650–4656, Dec. 1988.
Sztipanovits et al, Robotics & Automation, May 1990, "Intelligent Monitoring and Diagnositcs for Plant Automation", pp. 1–12.

Primary Examiner—Thomas G. Black
Assistant Examiner—Thomas S. Auchterlonie
Attorney, Agent, or Firm—Fish & Richardson

[57] ABSTRACT

An optimization method is used in a real-time diagnostic system that monitors alarm sources and detects possible sources of failure in an industrial process. When the diagnostic system detects one or more alarms, it determines which components are likely sources of failure. The system determines the level of criticality of certain other, currently off-line, alarms sources and schedules the off-line alarms for evaluation according to their levels of criticality. The system refines its analysis of likely sources of failure by evaluating the status of the previously off-line alarm sources Those previously off-line alarm sources are added to the grouping of possible sources of failure prior to repeating the evaluation process. The evaluation process is repeated, with the analysis of likely causes of failure being continually refined.

18 Claims, 4 Drawing Sheets

OPTIMIZATION METHOD FOR ADAPTIVE SENSOR READING SCHEDULING AND DELAYED ALARM EVALUATION IN REAL-TIME DIAGNOSTIC SYSTEMS

BACKGROUND OF THE INVENTION

The present invention relates in general to diagnostic systems, and more particularly to an optimization method for scheduling an evaluation sequence of off-line alarm sources in a real-time diagnostic system.

In complex industrial processes, a computerized fault diagnostic system is frequently used to monitor alarms and detect possible sources of failure in the industrial process. Real-time fault diagnostic systems observe the operation of processes, detect the appearance and propagation of faults, and continuously update the list of possible fault causes to support on-line decision making for deciding whether to intervene in the process being monitored.

The ultimate purpose of the diagnostic system is to minimize the cost of the operation of industrial processes by finding all possible sources of detected process anomalies as early as possible, and by predicting the prospective impact of the faults on the operation of related process components. These techniques are particularly applicable in chemical and power engineering processes because of the extreme expense of down-time and the impact suffered as a result of a degradation of product quality.

A diagnostic system is frequently used to monitor extremely complex industrial operations, such as in a chemical or power plant. A typical complex industrial operation can have thousands of components performing hundreds of operations at any given time. Many of these operations are interdependent, and constantly interact with each other. The failure of any one component can potentially affect the performance of other operations that do not directly use the failed component. Therefore, a single component fault can effectively propagate to many other operations, and set off many different fault indicating alarms.

Alarms, which can be the output of low-level sensors or fault detection algorithms, are sent to the diagnostic system continuously. It is the job of the diagnostic system to receive the incoming alarms and provide a diagnosis of the facility according to the latest alarm combination.

In most systems, because of cost considerations, only a subset of the available alarm generating sources are on-line to the diagnostic system at any one time. Off-line alarm sources, either particular sensors or fault detection algorithms, are usually prohibitively expensive to operate continuously. Off-line alarm sources thus often include sensors that are not currently connected to the diagnostic computer and fault detection algorithms that are not currently operating. Therefore, only a subset of the possible failure modes indicated by the on-line alarms can be tested at any one time. Off-line alarm sources are read only when a specific request is made to do so by the processing system.

Previous systems employ both symptom-based and model-based categories of real-time diagnostic methods. Symptom-based diagnostic methods collect failure symptoms and try to match them with a particular symptom pattern which is characteristic of a possible failure cause. The symptom-failure cause association may be found using pattern recognition methods, deterministic reasoning, or probabilistic reasoning. The main disadvantages of the symptom-based diagnostic methods are that the association is highly dependent upon operational conditions, and that a reliable diagnosis requires the presence of well-developed symptoms, a condition which is not tolerable in most industrial applications. These disadvantages occur in symptom-based diagnostic systems in part because the number of possible symptoms that are caused by various failure nodes can be prohibitively large.

Model-based methods provide much better performance than symptom-based methods, but can only be used when detailed information is available about the structure of the system being monitored. In model-based methods, a model of the industrial process is generated prior to operation of the system, and is used during the diagnostic process to locate the possible failure sources. Different types of models, including quantitative models, qualitative models, and graph models, can be used in the diagnostics. The application of graph models in large scale systems has been most promising, mainly because of the predictable computation load of the applied graph algorithms.

Many graph model-based diagnostic methods are known in the prior art. However, because the graph model method requires a closed alarm set for the analysis of the industrial process, most of the techniques presently used can be applied to only off-line diagnostics. In these earlier systems, the whole process usually had to be restarted to update the diagnosis for new incoming alarms. In real-time situations, restarting the diagnostic process was computationally prohibitive.

It therefore an object of the present invention to provide a diagnostic system that continuously receives incoming alarms and calculates the criticality of off-line alarms according to the latest alarm combination. It also an object of the present invention to provide a diagnostic system that schedules particular alarm readings and failure detection methods to obtain the most relevant alarm data for a particular situation.

SUMMARY OF THE INVENTION

The optimization method of the present invention is used in a real-time diagnostic system that monitors alarm sources and detects possible sources of failure in an industrial process. The user first creates a failure propagation graph of the industrial process to be monitored. The diagnostic system uses the failure propagation graph to determine likely causes of failure when it encounters a alarm or combinations of alarms at various components in the industrial process.

The failure propagation graph is a directed graph consisting of fault nodes and propagation paths. Fault nodes can be components of the industrial process having on-line alarm sources, components having off-line alarm sources, or components not having any alarm source. The propagation paths describe how faults propagate through the system, and each path is characterized by the upper and lower limits of the propagation time, and by the probability of propagation.

When the diagnostic system detects one or more alarms, it will determine which components are likely sources of failure. It may refine its analysis by requesting that certain other, currently off-line alarm sources be turned on and then re-evaluating the likely causes of failure based on the status of the new set of alarm sources.

In particular, when the diagnostic system encounters an alarm at an on-line alarm source, it determines, by examining the failure propagation graph, all possible sources that could have failed and caused the alarm. The active alarm sources are placed in a primary alarm list. Any active alarms that have active alarm ancestors in the failure propagation graph are considered secondary alarms and are dropped from the list of primary alarms. All ancestors of the primary alarms form the failure source candidates. Each path from the possible failure source to the alarm source is analyzed using the minimum and maximum propagation times and the probability of propagation to remove unlikely failure sources from consideration.

The diagnostic system then performs a series of computations to determine whether any off-line alarm sources should be turned on to provide additional information. The diagnostic system examines all paths from each alarm source to possible failure source. The level of criticality of each off-line alarm is increased every time it is encountered on a path.

When all of the paths have been analyzed, the off-line alarm sources are scheduled for evaluation according to their levels of criticality. As the off-line alarm sources are turned on, they are added to the on-line alarm sources and the evaluation process is repeated, with the analysis of likely causes of failure being continually refined.

BRIEF DESCRIPTION OF THE DRAWINGS

Other objects, features and advantages of the invention will be apparent from the further description, together with the drawings in which.

DESCRIPTION OF A PREFERRED EMBODIMENT

The apparatus of the present invention is a real-time fault diagnostic system that responds to incoming on-line and (initially) off-line alarm information and identifies possible failure source candidates. The diagnostic system is based on a hierarchical failure propagation graph that represents graphically, fault nodes and fault propagation paths between plant components and plant operations.

Figure 1:
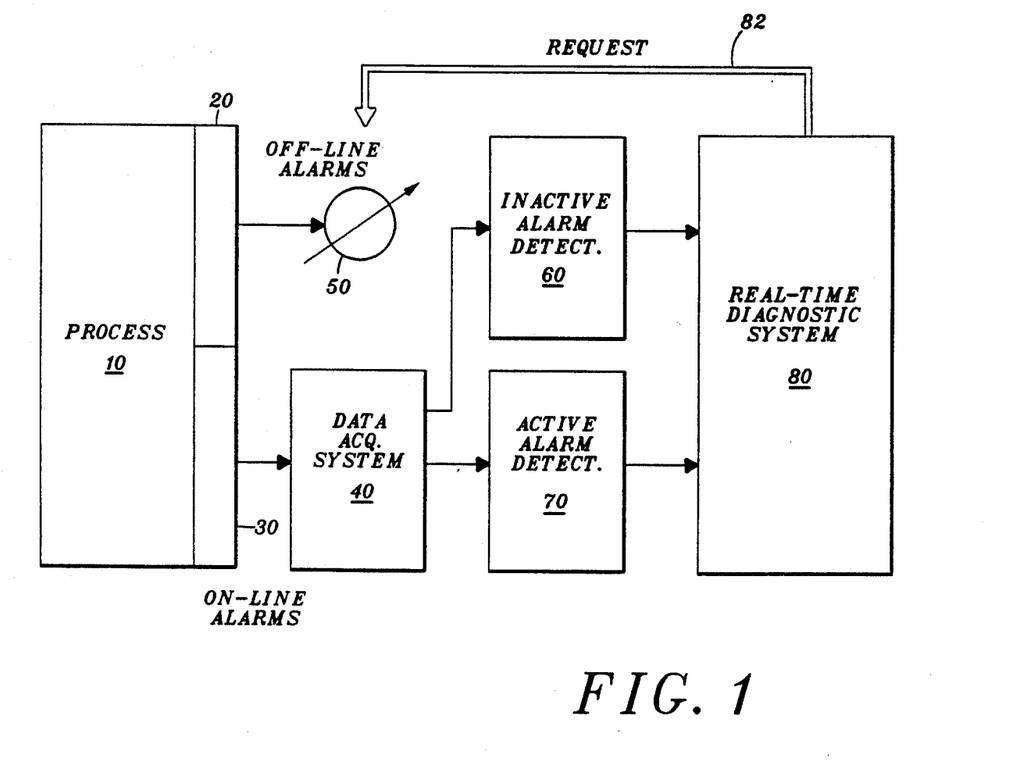
FIG. 1 is a block diagram showing a typical application environment of the system of the invention.

In accordance with the present invention, referring to FIG. 1, a real-time diagnostic system 80 operates based on a failure propagation graph and uses a directed graph 100 (FIG. 2) to represent fault nodes (a node at which a fault can be detected) and fault propagation paths which connect the fault nodes. Each fault propagation path is characterized by the upper and lower limit of the propagation time, and by the probability of propagation. These are factors determined by the diagnostic system designers and characterize the process being modeled. The propagation paths describe the possible ways that faults can propagate through the system.

Figure 2:
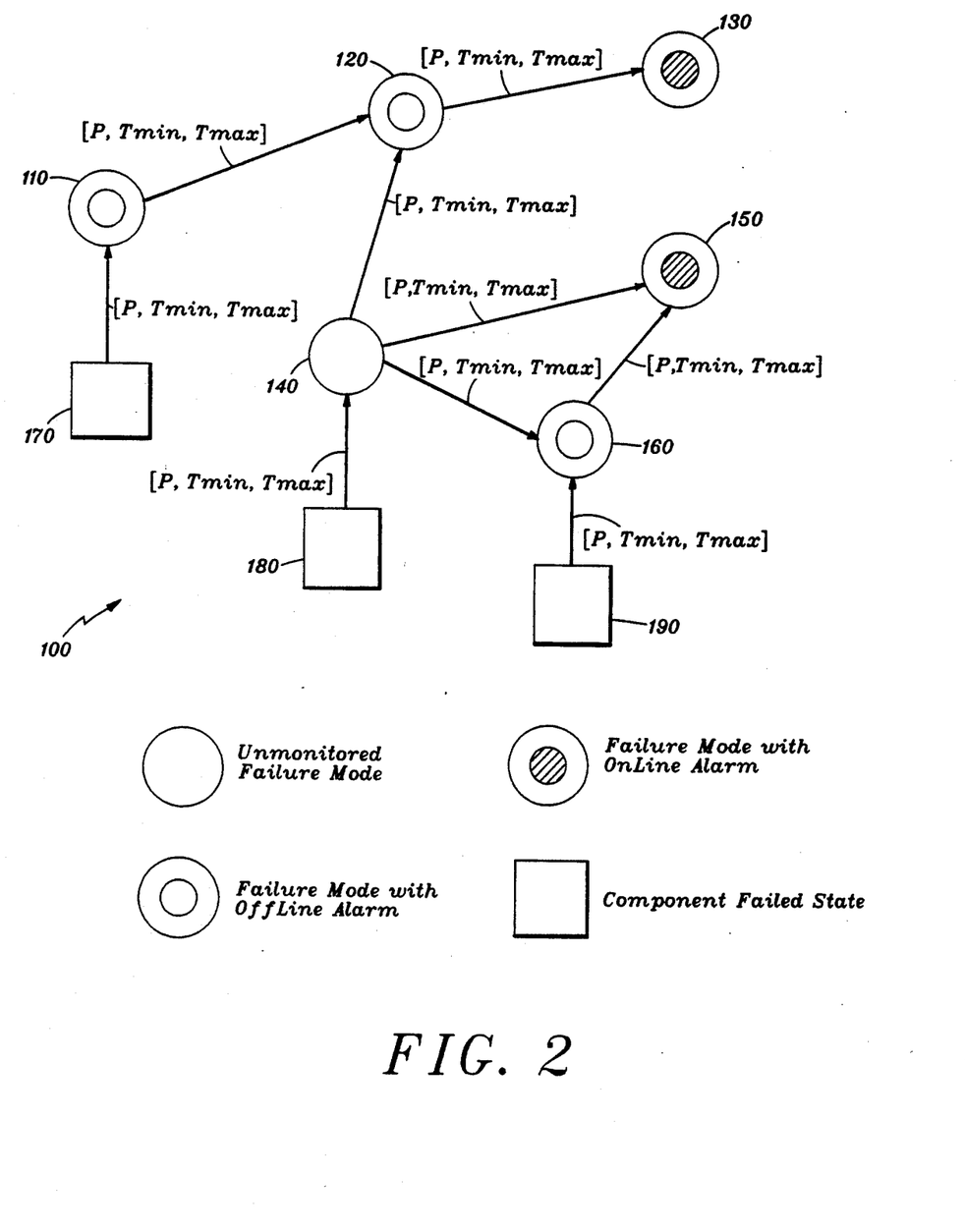
FIG. 2 is an example of a failure propagation graph for a particular process to be evaluated and analyzed.

Fault nodes in the directed graph are classified as one of three types: fault nodes with on-line alarm sources, either direct sensors or fault detection algorithms; fault nodes with off-line sources; and fault nodes without alarm sources. Off-line alarm sources are usually those that are too costly to run continuously, but that can be turned on when requested.

Referring to FIG. 1, an industrial process system 10, to be monitored and controlled, has off-line alarm sources 20 and on-line alarm sources 30. The on-line alarm sources 30 send signals to a data acquisition system 40, while no output, indicated at 50, is received from the off-line alarm sources. The signals from the on-line alarm sources 30 are then analyzed by the real-time diagnostic system 80 to determine whether they should be classified as normal (inactive) alarms or abnormal (active) alarms, diagrammatically illustrated as blocks 60 and 70 respectively although the actual classification does not take place until after diagnosis by system 80.

The real-time diagnostic system 80 processes the alarm signals in order to predict likely sources of failure. The real-time diagnostic system requests over lines 82 that certain of the off-line alarm sources 50 be turned on to refine the analysis of likely sources of failure as described in more detail below. As off-line alarm sources 50 are turned on, they become on-line alarm sources and their associated signals are sent to the real-time diagnostic system through data acquisition system 40. The real-time diagnostic system repeats its analysis of the signals sent from all of the now on-line alarm sources, using the newly available signals to further refine its analysis of the likely sources of failure.

Referring to a simplified failure propagation graph 100 of FIG. 2, according to the present invention, each node 110, 120, 130, 140, 150, 160 represents the process control system to be controlled and each component 170, 180, 190 of the system represents a possible component which might fail. The signals from each node having an on-line alarm (130, 150) are sent continuously to the real-time diagnostic system. When the real-time diagnostic system detects a fault at an on-line alarm, the system determines which component is the likely cause of failure.

For example, if the fault diagnostic system detected an alarm at nodes 130 and 150, it would first trace backwards through the graph to determine all nodes from which the fault could have originated, which in this case would be components 170, 180 and 190. The system then determines, as described in more detail below, if it could further refine its analysis by turning on a node presently having an off-line alarm, for example a node which could eliminate some components from consideration as failure-origination components.

Figure 3:
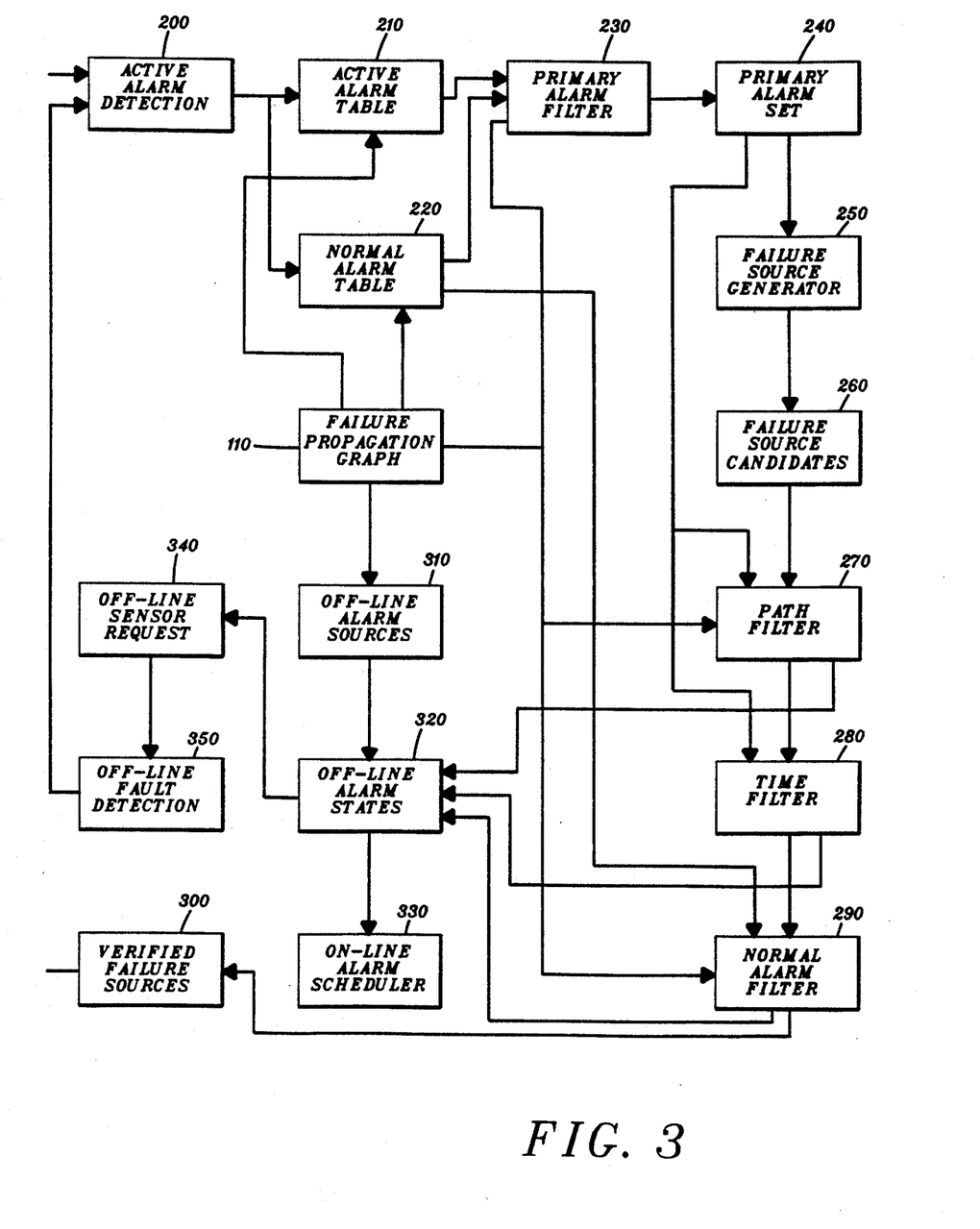
FIG. 3 is a flow chart showing the diagnostic procedure outline according to the invention.

FIG. 3 shows a block diagram of the real-time diagnostic system of the present invention. In the "Active Alarm Detection" function 200, the system examines the signals from on-line alarm sources and determines whether they have a normal status, called "normal alarms", or whether the signals are abnormal, or "active" alarms. Active alarms are stored in an active alarm table 210, and normal alarms are stored in a normal alarm table 220. As the diagnostic system receives information from each alarm, it updates the corresponding active alarm table and normal alarm table.

The system uses a series of filters to iteratively examine the tables, which contain the current status of the alarms, to determine probable sources of failure.

A primary alarm filter 230 initially processes the data stored in both the active alarm table 210 and the normal alarm table 220. The primary alarm filter 230 tests possible fault propagation paths between the active alarms listed in active alarm table 210, and possible failure sources in the failure propagation graph (corresponding to the failure propagation graph 100 of FIG. 2).

Active alarms that have active alarm ancestors in the failure propagation graph are designated secondary alarms, that is, alarms have been activated because the fault has propagated and not because the fault has originated at this location. While all alarms are initially designated to be primary alarms, the alarms that are later determined to be secondary alarms are dropped from the list of primary alarms as stored in the primary alarm set 240.

All possible ancestors of the primary alarms, that is nodes or components from which a primary alarm can be reached according to the failure node graph, form the failure source candidates, are determined by failure source generator 250, and are stored at 260. The failure source candidates are tested with a sequence of filters 270, 280, 290 designed to eliminate failure points that are not consistent with the given time and probability constraints. The filters operate by determining whether paths having specific attributes exist between each selected failure source candidate and the primary alarms. If the appropriate path does not exist, the failure source candidate is discarded.

The path filter 270 is responsive to the primary alarm set, the description of the failure propagation path 100, and the failure source candidates, and checks whether each element of the primary alarm set is reachable, through any allowable paths (based upon propagation time and probability of occurrence), from a selected failure source candidate. If a particular failure source candidate is not on at least one of all possible paths leading to all elements of the primary alarm set, that particular failure source candidate can be eliminated from the consideration as a failure source.

The time filter 280 takes the remaining candidates, and in response also to graph 100 and the primary alarm set, checks whether the primary alarm set configuration is consistent with the minimum propagation times along the paths of the graph. If the minimum propagation time along a particular path from a failure source candidate to an element of a primary alarm set exceeds the time in which the failure actually occurred, that path can be eliminated.

The normal alarm filter 190 checks the remaining candidates, in response to the normal alarm set and graph 100, to determine whether the primary alarm set configuration is consistent with the maximum propagation time along the remaining allowable paths of the graph. If the maximum propagation time along a particular path from a failure source candidate to an element of a primary alarm set is less than the time in which the failure actually occurred, that path can be eliminated.

The failure source candidates that pass all of these filters become the verified failure sources as indicated at 300.

To determine which, if any, off-line alarm sources should be turned on to provide additional information and thereby limit further the number of verified failure sources, the diagnostic system performs a series of computations as follows.

Figure 4:
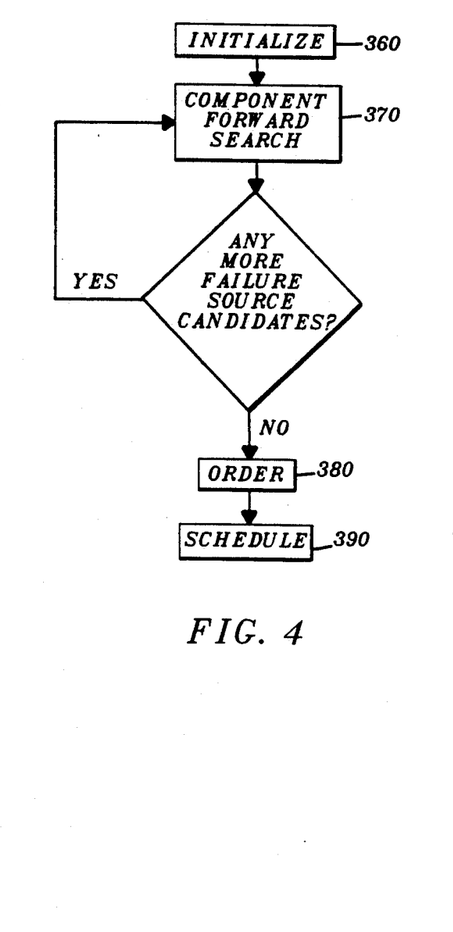
FIG. 4 is a flow chart of the main program in the diagnostic system according to the invention.

Referring to FIG. 4, the main control flow of the program determines which off-line alarm sources would be most optimum to be turned on. In the "INITIALIZE" procedure 360, the system obtains the failure propagation graph 100, the list of FAILURE SOURCE CANDIDATES, the TOTAL FAILURE NODES and the FAILURE MODE ALARM ASSOCIATION array from the main diagnostic system.

The FAILURE SOURCE CANDIDATES LIST contains all nodes that are verified failure source candidates 300. The TOTAL FAILURE NODES is the number of nodes in the graph, not including the FAILURE SOURCE CANDIDATES. The FAILURE MODE ALARM ASSOCIATION array contains one element for each of the nodes counted in the list of TOTAL FAILURE NODES. This array is used to determine the status of each node. Four values are possible, one for a node having NO ALARM, one for a node having an ON-LINE ALARM, one for an OFFLINE ALARM NOT REQUESTED, and one for an OFFLINE ALARM REQUESTED.

The system then creates two arrays, each having one element for each of the nodes included in TOTAL FAILURE NODES. One array, the CRITICALITY FAILURE NODE array is used to increase a criticality parameter, the criticality associated with each node being determined by the system. The second array, the NODEMARK array is used to mark each node as it is encountered, thereby preventing nodes from being examined more than is necessary.

The following arrays and lists are initially created using the failure propagation graph shown in FIG. 2:

| Failure source candidates: A, B, C Total Failure Nodes: D, E, F, G, H, I | | | | | | |
|---|---|---|---|---|---|---|
| | D | E | F | G | H | I |
| Criticality FM | 0 | 0 | 0 | 0 | 0 | 0 |
| Nodemark | 0 | 0 | 0 | 0 | 0 | 0 |
| Failure Mode Alarm* | 3 | 1 | 3 | 3 | 2 | 2 |

*where: '1'=No Alarm
'2'=On-Line Alarm
'3'=Offline Alarm Not Requested
'4'=Offline Alarm Requested Referring to FIG. 4, after initialization, the program calls procedure "COMPONENT FORWARD SEARCH" 370 for each component in the Failure source candidates List.

Figure 5:
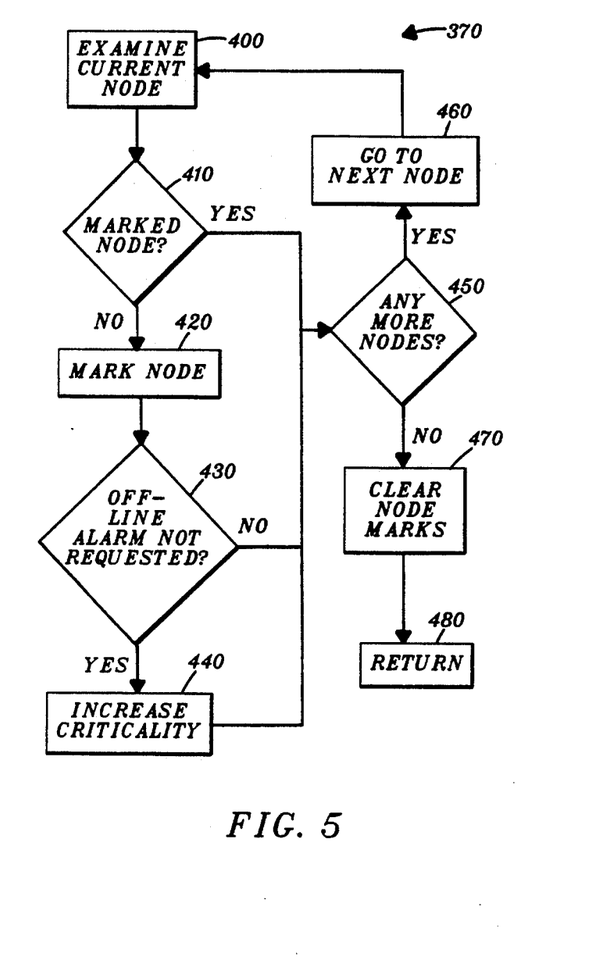
FIG. 5 is a flow chart of the Component Forward Search subroutine according to the invention.

Referring to FIG. 5, the "COMPONENT FORWARD SEARCH" procedure 370 starts, at 400, at the current component in the Failure source candidates List and traces forward node by node through the failure propagation graph. A node is tested at 410, and when a node that has not been previously marked is reached, as determined by looking at the NODEMARK array at that node, the node is marked at 420, and examined at 430 to determine whether it is a node having an OFFLINE ALARM NOT REQUESTED status. The criticality level is increased at 440 if the node has an OFFLINE ALARM NOT REQUESTED status.

For example, when the program reaches node "D" of FIG. 2 for the first time, it increases the criticality by 1 and marks the node as examined.

| | D | E | F | G | H | I |
|---|---|---|---|---|---|---|
| Criticality FM | 1 | 0 | 0 | 0 | 0 | 0 |
| Nodemark | 1 | 0 | 0 | 0 | 0 | 0 |
| Failure Mode Alarm | 3 | 1 | 3 | 3 | 2 | 2 |

The procedure then continues tracing forward through the graph in this way until all possible paths and associated nodes have been examined. In particular, the system checks at 450 for any more nodes to be examined, and either continues to the next node at 460 or terminates this search at 470 by clearing the NODEMARK array. Thus, when all nodes that are connected to one Failure Source Candidate have been examined, the NODEMARKS are cleared at 470 and control is returned at 480 to the main procedure. The procedure then continues for each next Failure Source Candidate.

As each Failure Source Candidate is examined, the level of criticality of a node is increased every time an off-line alarm source is encountered.

Referring FIG. 4, when all paths from all failure source candidates have been examined, the "ORDER" procedure 380 is called to order the nodes according to their respective levels of criticality. The "SCHEDULE" procedure 390 is then called and schedules those nodes, having high levels of criticality, and to be turned on-line. The status of any nodes that are so scheduled are changed to "OFF-LINE ALARM REQUESTED".

After the failure source verifications for the given set of failure source candidates and primary alarms is completed, and the off-line alarm sources have been ordered according to their accumulated criticality and are scheduled for evaluation, the system displays, in the illustrated embodiment, to the operator the demand for such off-line alarm readings.

Referring again to FIG. 3, the off-line alarm scheduler 330 sends the scheduled requests from software scheduler 390 to the off-line alarm sources, as indicated by a "request" indicated at a sensor 340. The results from the requested alarm are received by off-line alarm detection 350, which sends the data to the active alarm detection element 200. After evaluating the results from the requested alarms at alarm detector 200, the results of the sensor readings or the fault detection algorithms are used to update the active and normal alarm sets as described above. The diagnosis can thus be refined by applying the filters again, this time to the modified and enlarged alarm configuration. As off-line alarm sources continue to be turned on, the process continues to loop, and its analysis is refined to reduce the possible failure source candidates accordingly.

While the foregoing invention has been described with reference to a particular embodiment, it should be understood that various modifications and alterations will occur to those practiced in the art. Such modifications and alterations are intended to fall within the scope of the appended claims.

What is claimed is:

1. For use in a diagnostic system for analyzing operations of a monitored process, the system including alarms at each of a selected number of monitoring locations for providing alarm signals indicative of a function being monitored, a real-time monitoring method comprising the steps of:

selecting a first group of alarms to be monitored, processing signals from said first group of alarms for determining the occurrence of process fault conditions and identifying potential fault sources of said conditions, determining, upon the occurrence of at least one process fault condition, at least one other alarm to be selected from a group of alarms which are off-line, dynamically processing signals from said first group of alarms and said at least one other alarm for determining, with expected greater accuracy, said potential fault sources, and, wherein the alarms of said first group are on-line alarms and said other alarms are off-line alarms when said selecting and processing step is performed.

2. The method of claim 1 further comprising the step of modeling said process as a graph model having a plurality of on-line nodes representing functions being monitored by alarms in said first group of alarms, a plurality of off-line nodes representing functions being monitored by alarms not in said first group of alarms, a plurality of nodes representing functions of the monitored process not having alarms associated therewith, and a plurality of propagation paths selectively interconnecting pairs of nodes having a functional relationship.

3. The method of claim 2 wherein said step of determining said at least one other alarm comprises the steps of determining each originating fault source from which said alarms providing process fault condition could have originated;

tracing forward from each said determined originating source, using said graph model, along said propagation paths to said off-line and on-line nodes, increasing a criticality parameter value of each off-line node each time it is encountered during said tracing step, and selecting alarms corresponding to off-line nodes having a higher criticality parameter value as said other alarms to be processed.

4. The method of claim 2 wherein each propagation path is characterized by minimum and maximum propagation times corresponding to the time for said signals to propagate along said propagation path.

5. The method of claim 2 wherein each propagation path is characterized by a probability value corresponding to the likelihood that said signals will propagate along said propagation path.

6. The method of claim 2 wherein each said propagation path is characterized by a minimum time for said signals to propagate along said propagation path, and where said other alarm determining step comprises the steps of:

determining each originating fault source node from which said alarms providing fault source conditions could have originated, determining times at which said signals originated at each one of said possible originating fault source nodes, comparing the time within which said signals, originated at a node, reach a later destination node, with the minimum propagation time along each of said propagation paths, eliminating the paths where said minimum propagation time along the propagation path is greater than the time in which said signals reached a destination node, tracing forward from each said originating node along said propagation paths to a said monitoring node; and increasing a criticality parameter value of each off-line node encountered on said propagation paths from each said originating node to each said monitoring node.

7. The method of claim 2 wherein each said propagation path is characterized by a maximum time that said signals require to propagate along said propagation path, and wherein said determining step includes the steps of determining each originating fault source node from which said alarm providing fault source conditions could have originated;

determining the times at which said signals originated at each one of said possible originating fault source nodes;

comparing the time within which said signals, originated at a node, reached a later destination node, with the maximum propagation time along each of said propagation paths;

eliminating the paths where said maximum propagation time along the propagation path is less than the time in which said signals reached a said destination node, tracing forward from each said originating node along said propagation paths to a said monitoring node;

increasing a criticality parameter value of each off-line node encountered on said propagation paths from each said originating node to said monitoring node.

8. The method of claim 1 wherein said other alarm processing step comprises the steps of requesting alarm signals from at least one selected other alarm, and determining, in response to said signals from said first group of alarms and said requested signals from said selected other alarms, the potential fault sources of said conditions.

9. The method of claim 8 further comprising the step of iteratively repeating said requesting and fault source determining steps for more accurately identifying the fault sources of said conditions.

10. For use in a diagnostic system for analyzing operations of a monitored process, the system including alarms at each of a selected number of monitoring locations for providing alarm signals indicative of a function being monitored, a real-time monitoring apparatus comprising means for selecting a first group of alarms to be monitored, means for processing signals from said first group of alarms for determining the occurrence of process fault conditions and for identifying potential fault sources of said conditions, means for determining, upon the occurrence of at least one process fault condition, at least one other alarm to be selected from a group of alarms which are off-line, means for dynamically processing signals from said first group of alarms and said at least one other alarm for determining, with expected greater accuracy, said potential fault sources, and wherein the alarms of said first group are on-line alarms and said other alarms are initially off-line alarms.

11. The apparatus of claim 10 further comprising means for modeling said process as a graph model having a plurality of on-line nodes representing functions being monitored by alarms in said first group of alarms, a plurality of off-line nodes representing functions being monitored by alarms not in said first group of alarms, a plurality of nodes representing functions of the monitored process not having alarms associated therewith, and a plurality of propagation paths selectively interconnecting pairs of nodes having a functional relationship.

12. The apparatus of claim 11 wherein said means for determining said at least one other alarm comprises means for determining each originating fault source from which said alarms providing process fault condition could have originated;

means for tracing forward from each said determined originating source, using said graph model, along said propagation paths to said off-line and on-line nodes, means for increasing a criticality parameter value of each off-line node each time it is encountered by said tracing means, and means for selecting alarms corresponding to off-line nodes having a higher criticality parameter value as said other alarms to be processed.

13. The apparatus of claim 11 further comprising means for characterizing each propagation path by minimum and maximum propagation times corresponding to the time for said signals to propagate along said propagation path.

14. The apparatus of claim 11 further comprising means for characterizing each propagation by a path probability value corresponding to the likelihood that said signals will propagate along said propagation path.

15. The apparatus of claim 11 wherein each said propagation path is characterized by a minimum time for said signals to propagate along said propagation path, and where said other alarm determining means comprises:

means for determining each originating fault source node from which said alarms providing fault source conditions could have originated, means for determining times at which said signals originated at each one of said possible originating fault source nodes, means for comparing the time within which said signals, originated at a node, reach a later destination node, with the minimum propagation time along each of said propagation paths, means for eliminating the paths where said minimum propagation time along the propagation path is greater than the time in which said signals reached a destination node, means for tracing forward from each said originating node along said propagation paths to a said monitoring node; and means for increasing a criticality parameter value of each off-line node encountered on said propagation paths from each said originating node to each said monitoring node.

16. The apparatus of claim 11 wherein each said propagation path is characterized by a maximum time that said signals require to propagate along said propagation path, and wherein said determining means comprises

- means for determining each originating fault source node from which said alarm providing fault source conditions could have originated;
- means for determining the times at which said signals originated at each one of said possible originating fault source nodes;
- means for comparing the time within which said signals, originated at a node, reach a later destination node, with the maximum propagation time along each of said propagation paths;
- means for eliminating the paths where said maximum propagation time along the propagation path is less than the time in which said signals reached a said destination node,
- means for tracing forward from each said originating node along said propagation paths to a said monitoring node;
- means for increasing a criticality parameter value of each off-line node encountered on said propagation paths from each said originating node to said monitoring node.

17. The apparatus of claim 10 wherein said other alarm processing means comprises
- means for requesting alarm signals from at least one selected other alarm, and
- means for determining, in response to said signals from said first group of alarms and said requested signals from said selected other alarms, the potential fault sources of said conditions.

18. The apparatus of claim 17 further comprising the means for iteratively repeating the operation of said requesting and fault source determining means for more accurately identifying the fault sources of said conditions.

* * * * *